United States Patent
Lesher et al.

(10) Patent No.: US 7,181,512 B1
(45) Date of Patent: Feb. 20, 2007

(54) WORKSTATION DEPLOYMENT

(75) Inventors: Richard E. Lesher, Lincoln University, PA (US); John F. Esbenshade, Ardmore, PA (US); Jeffrey P. Radack, Waterford, CT (US); Karl M. Schuenzel, Irvington, NY (US); Peter Markey, Atlanta, GA (US); Daniel E. Patton, White Oak, PA (US)

(73) Assignee: Accenture Global Services GmbH (CH)

( * ) Notice: Subject to any disclaimer, the term of this patent is extended or adjusted under 35 U.S.C. 154(b) by 705 days.

(21) Appl. No.: 10/139,759

(22) Filed: May 6, 2002

(51) Int. Cl.
*G06F 15/173* (2006.01)
*G06F 15/177* (2006.01)
*G06F 9/445* (2006.01)
*G06F 9/44* (2006.01)
*G06F 13/00* (2006.01)
*G06F 17/00* (2006.01)

(52) U.S. Cl. ................. 709/223; 709/220; 717/177; 717/172; 719/321; 719/327; 707/104.1

(58) Field of Classification Search ........ 717/168–178; 709/200–203, 220–226
See application file for complete search history.

(56) References Cited

U.S. PATENT DOCUMENTS

| | | | |
|---|---|---|---|
| 5,742,829 A | | 4/1998 | Ben-Natan et al. .......... 717/178 |
| 5,845,077 A | * | 12/1998 | Fawcett ...................... 709/221 |
| 5,933,647 A | * | 8/1999 | Aronberg et al. ........... 717/178 |
| 5,953,533 A | * | 9/1999 | Fink et al. ................... 717/175 |
| 6,074,434 A | | 6/2000 | Pritko et al. ................. 717/173 |
| 6,714,992 B1 | * | 3/2004 | Kanojia et al. .............. 719/321 |
| 2002/0100036 A1 | * | 7/2002 | Moshir et al. ............... 717/173 |
| 2004/0153869 A1 | * | 8/2004 | Marinelli et al. ............. 714/47 |

FOREIGN PATENT DOCUMENTS

| | | |
|---|---|---|
| EP | 0 905 984 A | 3/1999 |
| EP | 0 950 948 A | 10/1999 |

* cited by examiner

*Primary Examiner*—Antony Nguyen-Ba
(74) *Attorney, Agent, or Firm*—Fish & Richardson P.C.

(57) ABSTRACT

Deployment of a workstation includes receiving data related to the computing environment of workstations, organizing the workstations into groups based on at least one selectable common attribute among the data, and producing a deployment schedule based on the groups.

20 Claims, 5 Drawing Sheets

WORKSTATION DEPLOYMENT

TECHNICAL FIELD

This invention relates to workstation deployment, and more particularly to a method and apparatus for the deployment of software onto one or more workstations distributed across an enterprise.

BACKGROUND

A typical enterprise may have a large number of computer workstations distributed over wide geographic areas spanning across different cities or countries. Each of the workstations can be configured with a computing environment that may include different and often incompatible hardware components and software components such as different operating systems or application programs. The computing environment may have to be upgraded or replaced with a new computing environment because the current computing environment may have become obsolete.

To deploy a new computing environment onto one or more workstations distributed across an enterprise often requires overcoming a large number of logistical problems. Factors such as the number and type of workstations in the enterprise must be considered. Moreover, it may be difficult to gather and analyze information related to the computing environment of all the workstations in an enterprise.

SUMMARY

In one aspect, the invention includes receiving data related to the computing environment of workstations, organizing the workstations into groups based on at least one selectable common attribute among the data, and producing a deployment schedule based on the results of organizing.

The aforesaid method may involve data that includes at least one of an organizational entity associated with the workstations, a geographic location of the workstations, or the hardware or software residing on the workstations. The method may also include a common attribute among the data that includes at least one of an organizational entity associated with the workstations, a geographic location of the workstations, or the hardware or software residing on the workstations.

The method may further include maintaining the deployment schedule on a database and a graphical user interface for displaying or updating the deployment. The deployment schedule may include an entry indicating the availability of a program to be used in producing the deployment schedule and an entry indicating a time period in which each of the workstations is to receive a program. The deployment process may also provide a new computing environment to the workstations, wherein the new computing environment includes at least one of a operating system, application program, or device drivers.

In a second aspect, an apparatus adapted to perform the methods disclosed above is provided.

A third aspect is an article comprising a computer-readable medium that stores computer executable instructions for causing a computer to perform the methods disclosed above.

In a fourth aspect, a method includes accessing a system configured to perform the methods disclosed above is provided.

In a fifth aspect, provided is an apparatus adapted to access a system configured to perform the methods disclosed above.

A sixth aspect of the invention is a system that includes a server computer coupled to workstations over a network, wherein the server computer is adapted to perform the above methods.

In various implementations, the invention may provide one or more of the following advantages. The deployment process can produce a deployment schedule for a large number of workstations distributed over wide geographic areas that may span across different cities or countries. The deployment process can gather and analyze information related to the computing environment of these disparate workstations. The deployment process can test and monitor the process of verifying whether the new operating system that is to be deployed on the workstation functions properly with the application programs on the workstations. As a result, an enterprise with a large number of workstations can receive a new computing environment that can include a new operating system and application programs that properly operate with the new operating system.

The deployment process may help improve the workflow associated with the process of deploying workstations. The process centralizes the deployment activities by having business departments identify the time frame in which the deployment schedule is to be executed. The progress of the deployment activities can be monitored automatically by a single centralized database. The deployment schedule can provide the members of a deployment team a list of the users, type of hardware, software, or specific configuration each workstation is to receive. As a result, the process can be performed in a timely manner by improving the coordination of the efforts of administrative personnel responsible for deploying the new computing environments.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
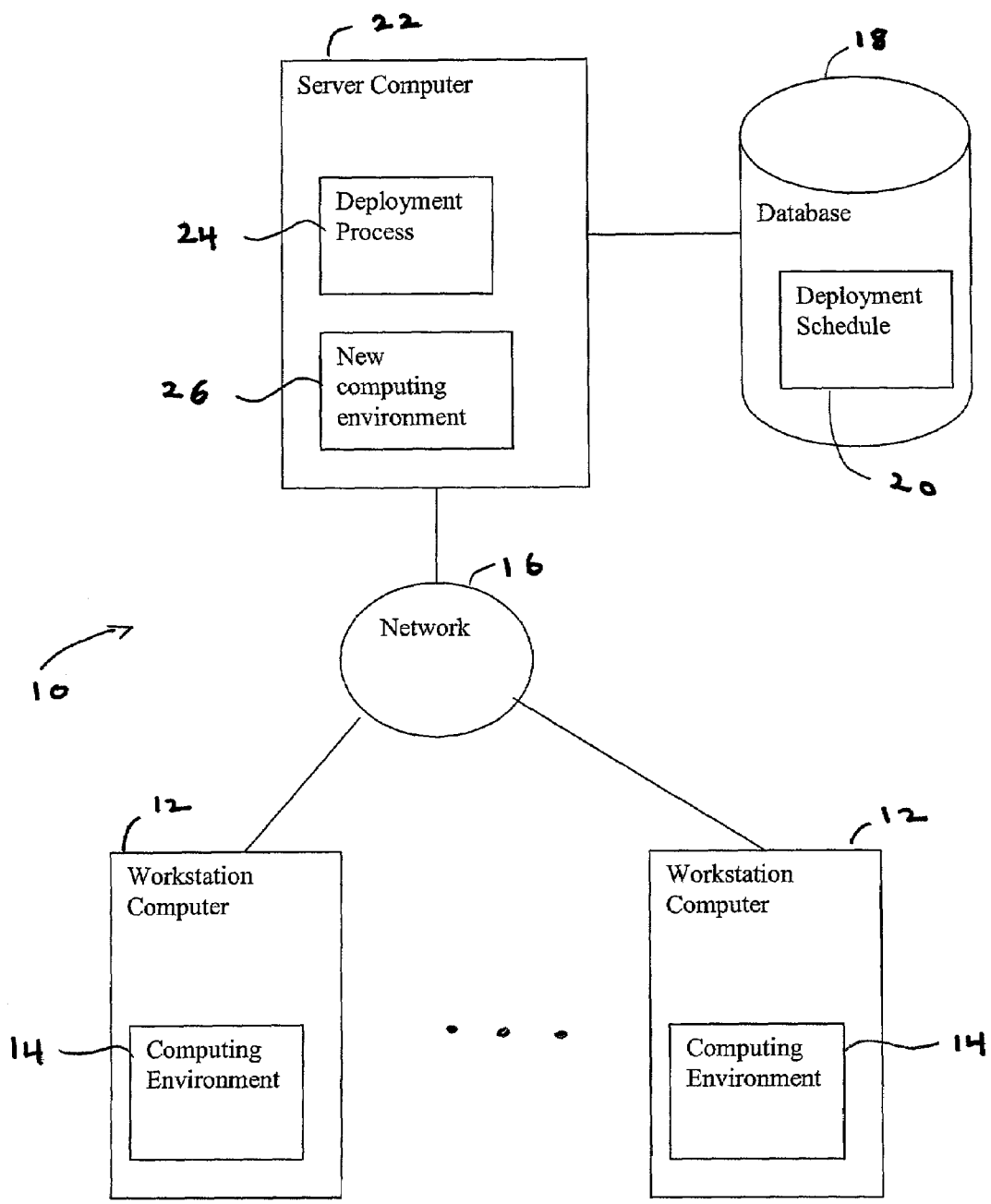
FIG. 1 is a simplified block diagram of a workstation deployment system according to an implementation of the invention.

FIG. 1 is a simplified block diagram of a workstation deployment system 10 according to an implementation of the invention. The deployment system 10 includes one or more workstation computers 12 wherein each workstation is configured to operate according to a computing environment 14. The computing environment 14 can include information such as the organizational entity associated with the user of the workstation, the geographic location of the workstation, the hardware or software components residing or executing on the workstation, or other information. The software components can include a operating system, device drivers, application programs, or other software components. The workstation computers 12 communicate with a server computer 22 over a network 16 such as a wired or wireless network.

The server computer 22 includes a deployment process 24 that gathers and analyzes information related to the computing environment 14 of each of the workstations 12. The deployment process 24 produces a deployment schedule 20 that is based on the computing environment 14 of each of the workstations. The deployment schedule is maintained in a database 18. The deployment process 24 creates a new computing environment 26 for the workstations 12. The new computing environment 26 can include software components such as a new operating system, application programs, device drivers, or other software components. The deployment process 24 and deployment schedule 20 facilitates the deployment of the new computing environment 26 onto the workstations 12.

Figure 2:
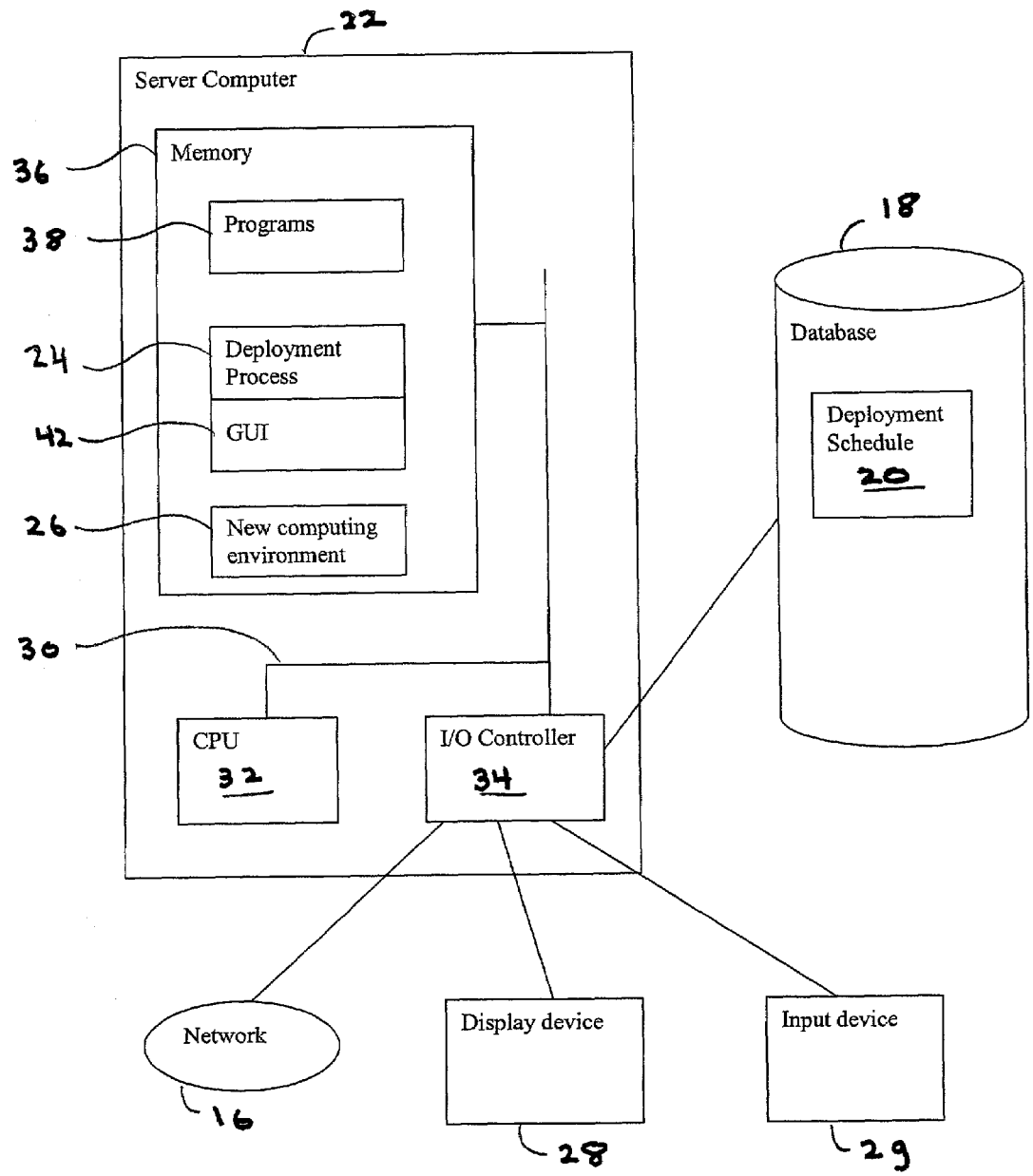
FIG. 2 is a detailed block diagram of a server computer according to an implementation of the invention.

FIG. 2 is a detailed block diagram of a server computer 22 according to an implementation of the invention. The server computer 22 can be implemented as a single server computer that includes a computer bus 30 connecting a central processing unit (CPU) 32 to memory 36. The CPU 32 is capable of executing programs 38 residing in memory 36 and processing data stored in memory. The programs 38 can include an operating system such as MICROSOFT WINDOWS 2000 SERVER, device drivers for handling low-level aspects of hardware components, application programs such as MICROSOFT OFFICE, or other programs. The CPU 32 can include and INTEL PENTIUM-processor or other processor. The memory 36 can be a combination of read only memory (ROM), random access memory (RAM), static RAM (SRAM), dynamic RAM (DRAM), or other memory.

The memory 36 also includes the deployment process 24 which can be implemented as a set of software instructions adapted to gather and analyze data such as the computing environment 14 from the workstations 12 and produce the deployment schedule 20. The deployment process 24 uses a graphical user interface (GUI) to allow the display or update of the deployment schedule 20. The deployment process 24 is also responsible for providing the new computing environment 26 that the workstations are to receive according to the deployment schedule 20. The new computing environment 26 is stored in memory 36 but can be stored in the database 18 or some other storage resource on another computer. The deployment process 24, the deployment schedule 20, and the new computing environment 26 is described in further detail below.

An input/output (I/O) controller 34 is used to couple the server computer 22 to hardware and software components such as the database 18, the network 16, a display device 28, an input device 29, or other components. The database 18 can be used to store data related to the execution of the programs 38 including data related to execution of the deployment process 24 such as the deployment schedule 20. The database 18 can be implemented using a database management program such as MICROSOFT SQL 2000, ORACLE, SYBASE, or other database management program.

The display device 28 can include a computer display capable of displaying data related to the execution of programs on the server computer 22. For example, the display device can display data associated with the deployment schedule 20 during the execution of the deployment process 24. The input device 28 can include a pointing device such as a mouse, track ball, light pen, touch sensitive display, or other type of peripheral device and may be used in combination with a keyboard to input data into the programs 38 executing on the server computer 22.

The I/O controller 34 can include hardware and software components for connecting the server computer 22 to the network 16. The server computer 24 is capable of communicating over a wired or wireless network such as, for example, a local area network (LAN), wide area network (WAN), Ethernet, the Internet, or other network. In the above discussion, the workstations 12 have been described as computers having computing environments 14 that are typically operated by users in an enterprise. However, any computer, such as one of the workstations 14, can be configured as an administrative computer to access the server computer 22 for the purpose of executing the deployment process 24, producing the deployment schedule 20, and providing the workstations 12 with a new computing environment 26.

Figure 3A:
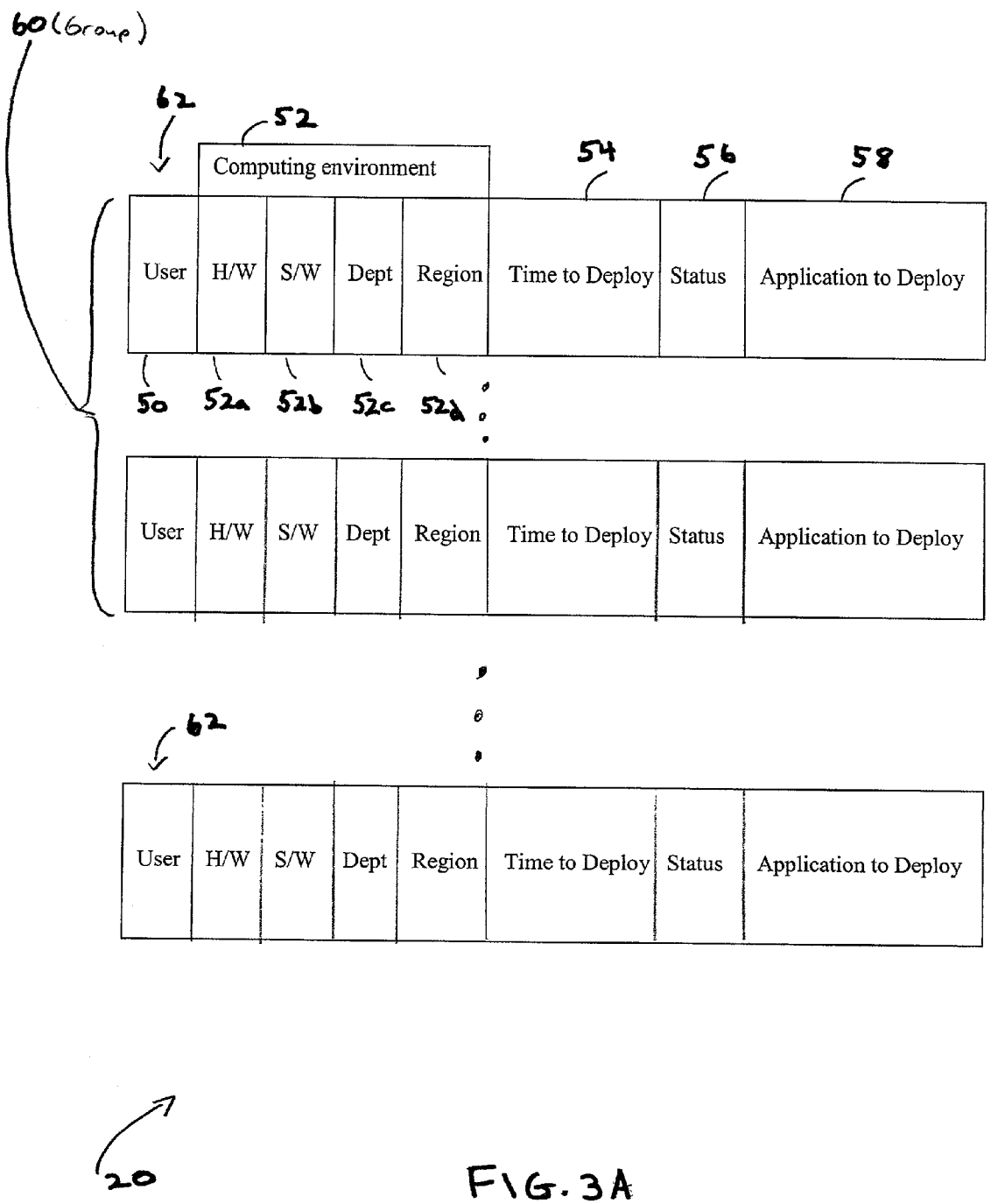
FIG. 3A is a diagram of data related to the deployment schedule according to an implementation of the invention.

FIG. 3A is a diagram of data related to a deployment schedule 20 according to an implementation of the invention. The deployment process 24 produces the deployment schedule 20 based on data related to the computing environment 14 of the workstations 12. The deployment schedule 20 includes an entry 62 for each user or workstation 12. Each workstation entry 62 includes a user field 50 identifying the workstation with attributes such as the name of the user of the workstation 14, a computer identification number of the workstation, and/or some other unique identifier.

The workstation entry 62 also includes a computing environment section 52 that has a hardware (H/W) field 52a, a software (S/W) field 52b, a department field 52c, and a region field 52d. The data in the computing environment section 52 is based on the computing environment 14 gathered from the computer workstations 12. The H/W field 52a can contain data related to the type of hardware the workstation contains such as the type and amount of storage, the type and amount of memory, the type of graphical display, the type of network card, or other type of hardware related data.

The S/W field 52b contains data related to software executing or residing on the computer workstation 12. Such data can include the type of operating system, device drivers, application programs, or other data. The department field 52c contains data identifying an organizational entity associated with the workstation. An example of such data includes a department within an enterprise such as an accounting department, a legal department, marketing department, or other data. The geographical location, such as a city or country, of the location of the workstation 12 is represented by data in the region field 52d.

The time to deploy field 54 indicates date and time information related to when the workstation 12 is to receive the new computing environment 26. The time to deploy field 54 can be used by the deployment process to determine when an alert should be sent to the user of the workstation 12 indicating the time frame when the workstation is to receive the new computing environment 26. The status field 56 represents the status of the deployment process such as data indicating whether the workstation 14 has received the new computing environment 26. The application to deploy field 58 includes data indicating the names and status of the application programs that each of workstations 12 is to receive.

The deployment process 24 can produce the deployment schedule 20 by organizing each entry 62 into groups of workstations 60 based on a selectable common attribute among the data in each entry 62. For example, the workstations can be organized according to the type of hardware residing on the workstation represented by the H/W field 52a. Likewise, the software residing on the workstation represented by the S/W field 52b can be used to organize the workstations. Moreover, other fields can be used to organize the groups of workstations 60.

Figure 3B:
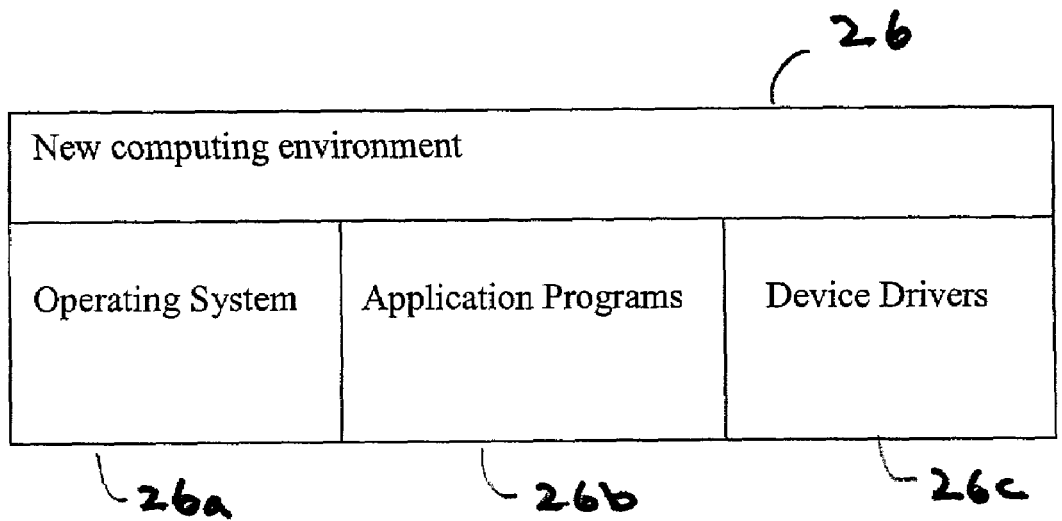
FIG. 3B is a diagram of data related to the new computing environment according to an implementation of the invention.

FIG. 3B is a diagram of data related to the new computing environment 26 according to an implementation of the invention. The new computing environment 26 that the workstations 12 are to receive is represented by a data structure having a new operating system field 26a, application programs field 26b, and a device drivers 26c field. In one embodiment, the new operating system 26a field can refer to an operating system such as MICROSOFT WINDOWS XP, the application program field 26b can refer to an application program such as Adobe Acrobat, and the device driver 26c field can refer to a device driver such as a network card driver. The deployment schedule 20 keeps track of these software components indicated in the new computing environment 26, but the actual software components may be stored in the memory 36 of the server computer 22, in a separate portion of the server computer 22, or on a separate computer.

Figure 4:
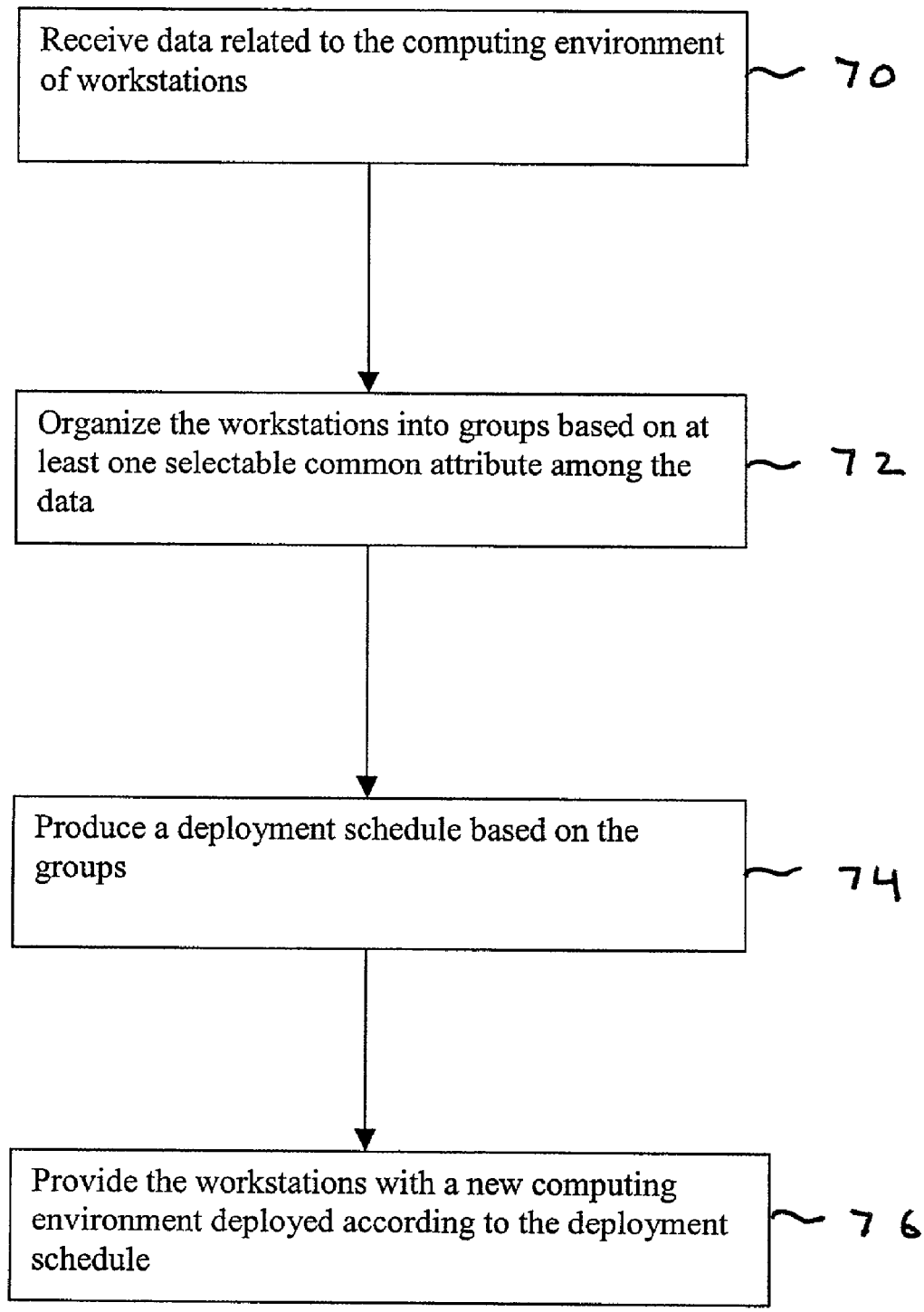
FIG. 4 is a flow chart according to an implementation of the invention.
Figure 1:
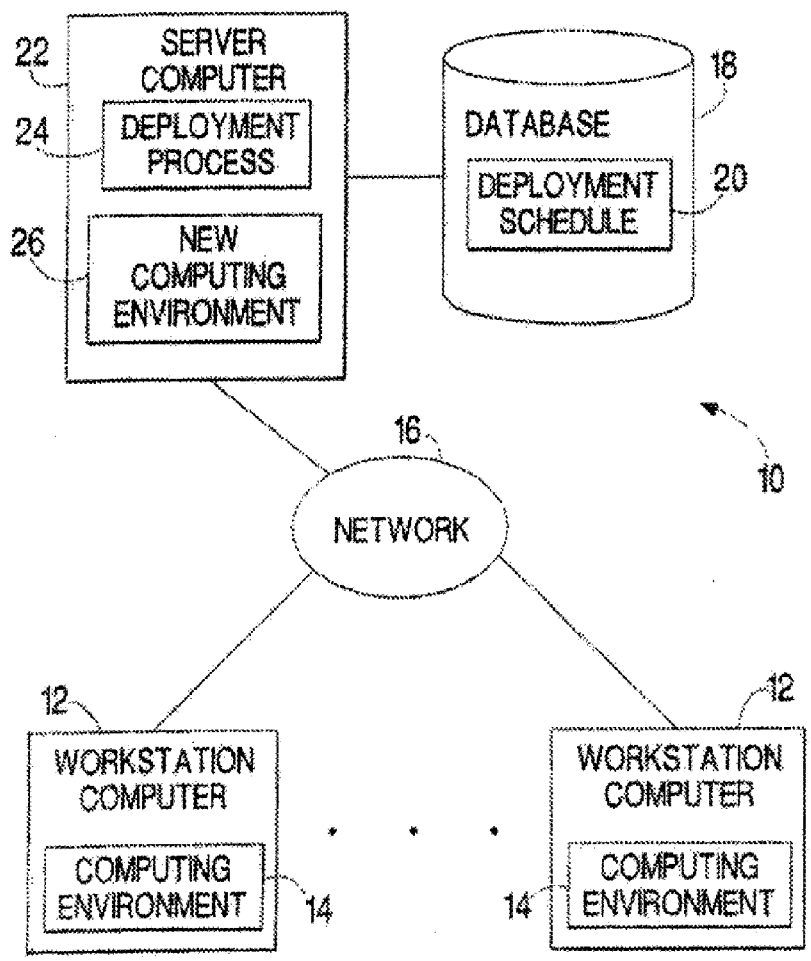
Figure 2:
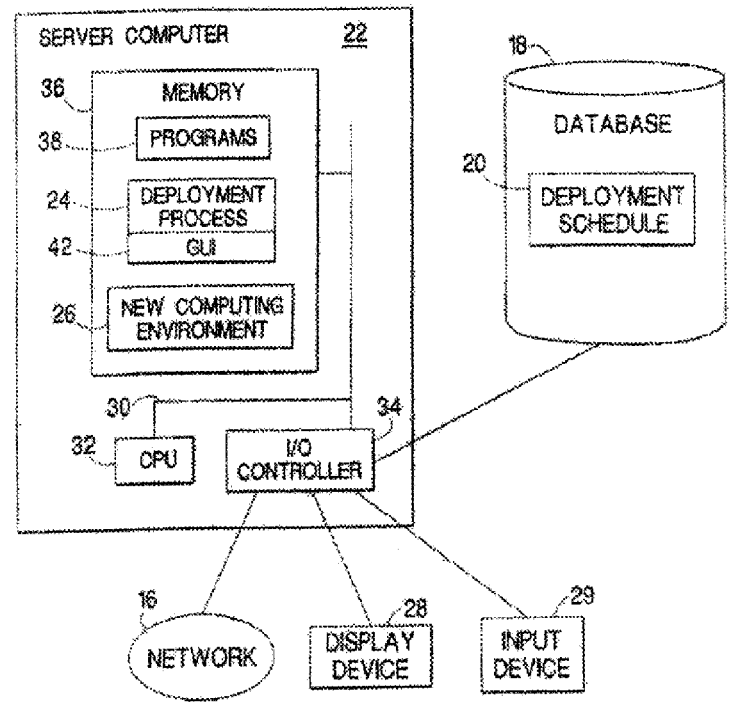
Figure 3A:
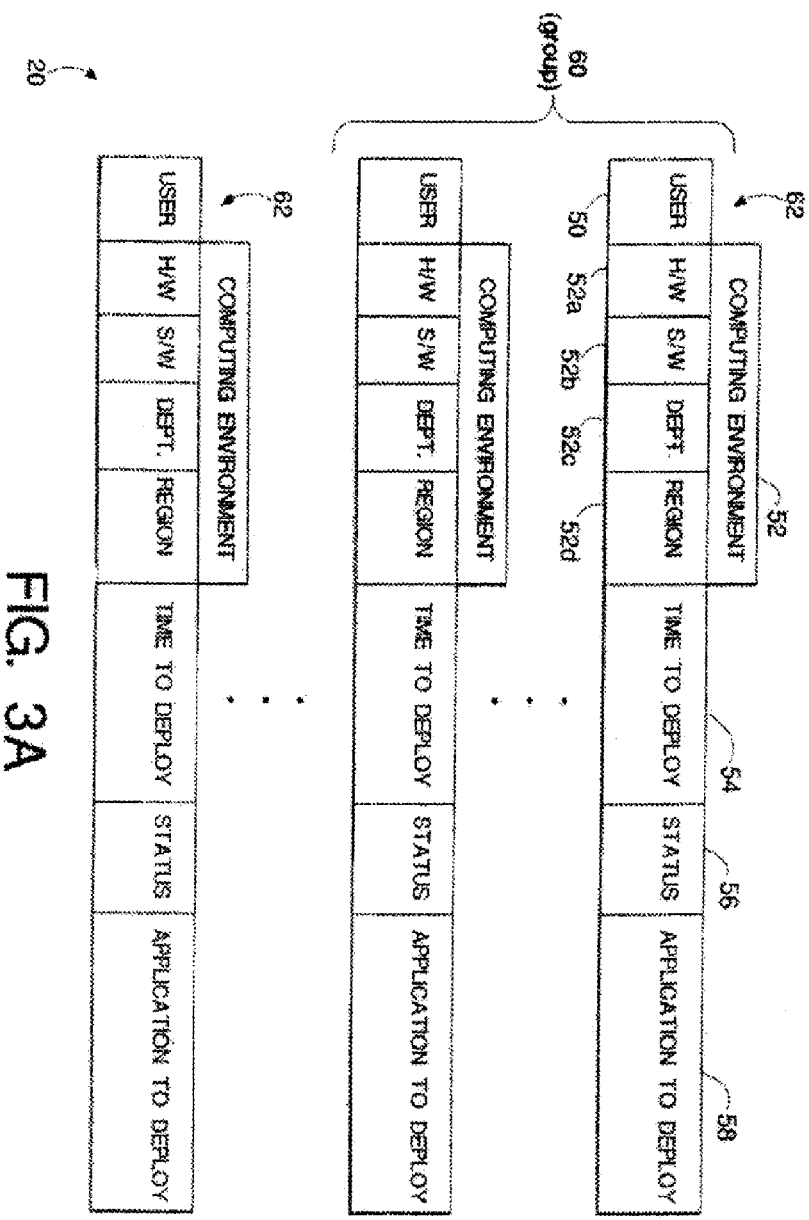
Figure 3B:
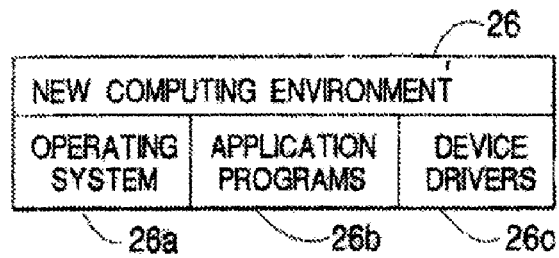
Figure 4:
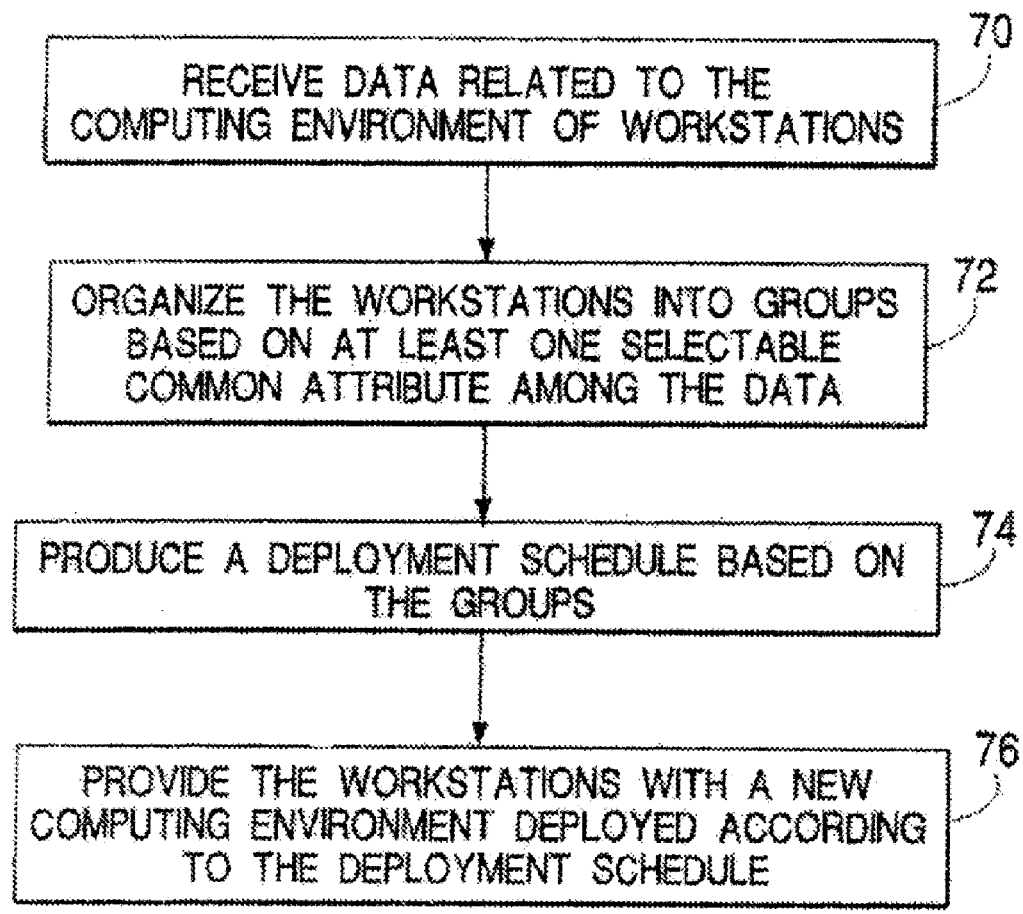

FIG. 4 is a flow chart of the deployment process according to an implementation of the invention. The server computer 22 receives 70 data related to the computing environment 14 of the workstations 12. As described above, each user or workstation 12 is assigned an entry 62 in the deployment schedule 20 and each entry is stored in the database 18. The data for each entry 62 in the computing environment section 52 can be obtained by a combination of inventory tools such as SMS provided by MICROSOFT. The data also can be imported from other source of data such as contact management programs, electronic mail (E-mail) programs, or other sources of user data.

By gathering this information in a single location such as the database 18, problems can be identified before the workstations receive the new computing environment 26. For example, the information can reveal whether a particular application program residing on the workstation 12 is compatible with the new operating system that is part of the new computing environment 26. In addition, the information can reveal whether the current hardware on the workstation 12 is adequate for the new operating system that the workstation is to receive.

As mentioned above, the S/W field 52b can contain the names of application programs residing on the workstation 12. The deployment process 24 is able to map the names of the application programs containing "exe" extensions into a generic program name for ease of processing. This mapping process allows software administration personnel to quickly verify the names of the application programs using a single name rather then to have to search through a list of application programs containing numerous "exe" extensions.

The time to deploy field 54 can be set to a time frame indicating a time and date when each of the workstations 12 is to receive the new computing environment 26. The time frame can be based on factors such as the availability of the workstation 12, the amount of data traffic experienced by the network 16 during a particular time frame, the availability of the application programs that comprise the new computing environment 26, or other factors. The status field 56 can be set to a value indicating whether the workstation 12 has received the new computing environment 26.

The application to deploy field 58 can be set to a value to indicate the name and status of each if the application programs that comprise the new computing environment 26. Executing the deployment schedule 20 involves deploying a new computing environment 26 that can include a new operating system and one or more application programs. Before the deployment schedule 20 can be executed, the deployment process 24 verifies whether the application programs can properly operate with the new operating system. Such a verification process includes installing the new operating system and one or more application programs on a test workstation and testing whether the application program properly operates under the new operating system. Once the operation of the application program has been verified, the value of the application to deploy field 58 can be updated to indicate the application program is ready for deployment.

Once the data related to the computing environment 14 has been received from the workstations 12, the server computer 22 organizes 72 the workstations into groups 60 based on at least one selectable common attribute among the data. The common attribute can be selected based on factors such as the number of geographic locations and number of workstations at each location, the number of departments and the number of workstations assigned to each department, the type of hardware and software installed on the workstation, or other factors. Moreover, each group 60 can be further subdivided into one or more sub-groups. For example, the workstations 12 can be grouped into regions based on the region field 52d and that group can be further subdivided into a sub-group that includes the type of hardware components installed on each of the workstations based on the data in the H/W field 52a.

Once the workstations 12 have been organized, the server computer 22 produces 74 a deployment schedule 20 based on the results of organizing the workstations. The deployment process 24 analyses the deployment schedule 20 and determines whether the workstations 12 indicated in the deployment schedule are prepared to receive the new computing environment 26. For example, the application to deploy field 58 is examined to determine whether the application program listed in the field has been verified and is ready to be deployed to the workstation 12. If the deployment schedule 12 indicates that the application program has been verified, then a message, such as an E-mail, can be sent notifying the user of the workstation of the time frame in which the workstation is to receive a new computing environment 26.

The deployment process 24 provides 76 a new computing environment 26 to the workstations 12 according to the deployment schedule 20. The deployment schedule 20 can be viewed and updated by system administrative personnel using the GUI 42 portion of the deployment process 24. The deployment schedule 20 is updated during the process of deploying the computing environment 26 to the workstation 14. For example, the status field 56 associated with a workstation can be updated to indicate whether the workstation has received a new computing environment 26.

As mentioned above, the new computing environment 26 can include a new operating system and application programs that have been verified to function properly with the new operating system. The actual operating system and application program that comprises the new computing environment 26 can be maintained by a separate program on the server computer 22, on a separate computer, or a distributed among a combination of computers. In one embodiment, when it is time for the workstation 12 to receive the new computing environment 26, the deployment process 24 can send a signal to a separate process that is responsible for sending the software components that comprised the new computing environment 26 to the workstation 12. The separate process can respond by sending the software components comprising the new computing environment 26 to the workstation 12 indicated in the signal.

The deployment process 22 also can handle post deployment functions once the workstations 12 have received the new computing environment 12. For example, workstations 12 may be geographically located close to each other and may include configuration information that enables them to share a common resources such as a printer. The deployment process 24 can restore the configuration information after the workstation has received the new computing environment 26 so that the workstation can continue using the shared resource as it had done before the new computing environment. Likewise, other configuration information such as account numbers, password access, shared storage resources such as a hardrive, or other configuration information can be restored so that the deployment and operation of a new computing environment 26 on the workstation appears seamless to the user of the workstation.

A number of embodiments of the invention have been described. Nevertheless, it will be understood that various modifications may be made without departing from the spirit and scope of the invention. For example, the deployment process 20 can produce a deployment schedule that is distributed among one or more databases. Accordingly, other embodiments are within the scope of the following claims.

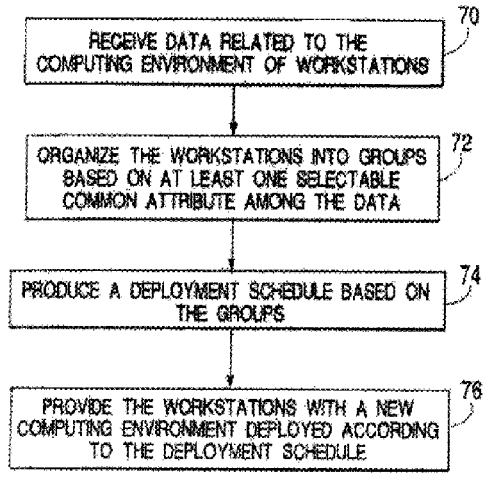

What is claimed is:

1. A computer-implemented method comprising:
   receiving data related to computing environments of a plurality of workstations;
   organizing the workstations into groups based on at least one selectable common attribute among the received data; and
   producing a deployment schedule based on the received data and comprising at least one of the groups, the deployment schedule defining a time frame during which the workstations organized into the at least one of the groups are to receive a deployment and including an entry indicating availability of a program to be used in producing the deployment schedule and an entry indicating a time period during the time frame in each of the workstations is to receive a program;
   maintaining the deployment schedule on a database;
   providing a new computing environment to the workstations, the new computing environment including at least one of an operating system, application program, or device drivers.

2. The method of claim 1, wherein the data includes at least one of an organizational entity associated with the workstations, a geographic location of the workstations, or the hardware or software residing on the workstations.

3. The method of claim 1, wherein the common attribute among the received data includes at least one of an organizational entity associated with the workstations, a geographic location of the workstations, or the hardware or software residing on the workstations.

4. An apparatus comprising:
   a memory; and
   a processor coupled to the memory, wherein the processor is configured to perform operations comprising:
   receive data related to a computing environment comprising a plurality of workstations;
   organize the workstations into groups based on at least one selectable common attribute among the received data; and
   produce a deployment schedule comprising a new computer environment for the workstation, the deployment schedule based on the received data and comprising at least one of the groups, the deployment schedule defining a time frame during which the workstations organized into the at least one of the groups are to receive a deployment and including an entry indicating availability of a program to be used in producing the deployment schedule and an entry indicating a time period during the time frame in which each of the workstations is to receive a program; and
   a database to maintain the deployment schedule;
   wherein the new computing environment includes at least one of a operating system, application program, or device drivers.

5. The apparatus of claim 4, wherein the data includes at least one of an organizational entity associated with the workstations, a geographic location of the workstations, or the hardware or software residing on the workstations.

6. The apparatus of claim 4, wherein the common attribute among the received data includes at least one of an organizational entity associated with the workstations, a geographic location of the workstations, or the hardware or software residing on the workstations.

7. An article comprising a computer-readable medium that stores executable instructions for causing a computer system to perform operations comprising:
   receive data related to a computing environment comprising a plurality of workstations;
   organize the workstations into groups based on at least one selectable common attribute among the received data; and
   produce a deployment schedule based on the received data and comprising at least one of the groups, the deployment schedule defining a time frame during which the workstations organized into the at least one of the groups are to receive a deployment and including an entry indicating availability of a program to be used in producing the deployment schedule and an entry indicating a time period during the time frame in which each of the workstations is to receive a program;
   maintain the deployment schedule on a database;
   wherein the deployment comprises a new computing environment for the workstations that includes at least one of a operating system, application program, or device drivers.

8. The article of claim 7, comprising instructions for causing the computer system to receive the data, wherein data includes at least one of an organizational entity associated with the workstations, a geographic location of the workstations, or the hardware or software residing on the workstations.

9. The article of claim 7, comprising instructions for causing the computer system to organize the received data, wherein the common attribute among the received data includes at least one of an organizational entity associated with the workstations, a geographic location of the workstations, or the hardware or software residing on the workstations.

10. A computer-implemented method comprising:
accessing a system that is configured to perform operations comprising:
receive data related to a computing environment comprising a plurality of workstations;
organize the workstations into groups based on at least one selectable common attribute among the received data; and
produce a deployment schedule based on the received data and comprising at least one of the groups, the deployment schedule defining a time frame during which the workstations organized into the at least one of the groups are to receive a deployment and including an entry indicating availability of a program to be used in producing the deployment schedule and including an entry indicating a time period during the time frame in which each of the workstations is to receive the program;
maintaining the deployment schedule on a database;
wherein the deployment comprises a new computing environment to the workstations, wherein the new computing environment includes at least one of a operating system, application program, or device drivers.

11. The method of claim 10, wherein the data includes at least one of an organizational entity associated with the workstations, a geographic location of the workstations, or the hardware or software residing on the workstations.

12. The method of claim 10, wherein the common attribute among the received data includes at least one of an organizational entity associated with the workstations, a geographic location of the workstations, or the hardware or software residing on the workstations.

13. The method of claim 10, wherein a graphical user interface is used for displaying or updating the deployment schedule.

14. An apparatus comprising:
a memory; and
a processor coupled to the memory, wherein the processor is configured to access a system that is adapted to perform operations comprising:
receive data related to a computing environment comprising a plurality of workstations;
organize the workstations into groups based on at least one selectable common attribute among the received data; and
produce a deployment schedule based on the received data and maintained on a database, the deployment schedule comprising at least one of the groups, the deployment schedule defining a time frame during which the workstations organized into the at least one of the groups are to receive a deployment, and including an entry indicating availability of a program to be used in producing the deployment schedule and including an entry indicating a time period during the time frame in which each of the workstations is to receive a program, and wherein the deployment comprises a new computing environment for the workstations, and wherein the new computing environment includes at least one of a operating system, application program, or device drivers.

15. The apparatus of claim 14, wherein the common attribute among the data includes at least one of an organizational entity associated with the workstations, a geographic location of the workstations, or the hardware or software residing on the workstations.

16. The apparatus of claim 14, wherein a graphical user interface is used for displaying or updating the deployment schedule.

17. A system comprising:
a plurality of workstations each having a computing environment; and
a server computer coupled to the plurality of workstations over a network, wherein the server computer is configured to perform operations comprising:
receive from the workstations data related to the respective computing environments of the workstations;
organize the workstations into groups based on at least one selectable common attribute among the received data;
produce a deployment schedule based on the received data and comprising at least one of the groups, the deployment schedule defining a time frame during which the workstations organized into the at least one of the groups are to receive a new computing environment, and including an entry indicating availability of a program to be used in producing the deployment schedule, and including an entry indicating a time period during the time frame in which each of the workstations is to receive a program; and
provide a new computing environment to at least one of the workstations; and
a database to maintain the deployment schedule;
wherein the new computing environment includes at least one of an operating system, application program, or device drivers.

18. The system of claim 17, wherein the data includes at least one of an organizational entity associated with the workstations, a geographic location of the workstations, or the hardware or software residing on the workstations.

19. The system of claim 17, wherein the common attribute among the received data includes at least one of an organizational entity associated with the workstations, a geographic location of the workstations, or the hardware or software residing on the workstations.

20. The system of claim 17, the server computer further comprising a graphical user interface for displaying or updating the deployment schedule.

* * * * *

UNITED STATES PATENT AND TRADEMARK OFFICE
CERTIFICATE OF CORRECTION

PATENT NO. : 7,181,512 B1
APPLICATION NO. :10/139759
DATED : February 20, 2007
INVENTOR(S) : Richard E. Lesher et al.

It is certified that error appears in the above-identified patent and that said Letters Patent is hereby corrected as shown below:

The title page showing an illustrative figure(s) 1 should be deleted and substitute therefore the attached title page consisting of Fig. 4.

The drawing sheets consisting of Fig(s) 1-4 should be deleted and substitute therefore the attached drawing sheets 1-5 consisting of Fig(s) 1-4..

Signed and Sealed this

Fifteenth Day of January, 2008

JON W. DUDAS
*Director of the United States Patent and Trademark Office*

(12) United States Patent
Lesher et al.

(10) Patent No.: US 7,181,512 B1
(45) Date of Patent: Feb. 20, 2007

(54) WORKSTATION DEPLOYMENT

(75) Inventors: Richard E. Lesher, Lincoln University, PA (US); John F. Esbenshade, Ardmore, PA (US); Jeffrey P. Radack, Waterford, CT (US); Karl M. Schuenzel, Irvington, NY (US); Peter Markey, Atlanta, GA (US); Daniel E. Patton, White Oak, PA (US)

(73) Assignee: Accenture Global Services GmbH (CH)

(*) Notice: Subject to any disclaimer, the term of this patent is extended or adjusted under 35 U.S.C. 154(b) by 705 days.

(21) Appl. No.: 10/139,759

(22) Filed: May 6, 2002

(51) Int. Cl.
G06F 15/173 (2006.01)
G06F 15/177 (2006.01)
G06F 9/445 (2006.01)
G06F 9/44 (2006.01)
G06F 13/00 (2006.01)
G06F 17/00 (2006.01)

(52) U.S. Cl. .............. 709/223; 709/220; 717/177; 717/172; 719/321; 719/327; 707/104.1

(58) Field of Classification Search ........ 717/168–178; 709/200–203, 220–226
See application file for complete search history.

(56) References Cited

U.S. PATENT DOCUMENTS

| 5,742,829 A | 4/1998 | Ben-Natan et al. | 717/178 |
| 5,845,077 A * | 12/1998 | Fawcett | 709/221 |
| 5,933,647 A * | 8/1999 | Aronberg et al. | 717/178 |
| 5,953,533 A * | 9/1999 | Fink et al. | 717/175 |
| 6,074,434 A | 6/2000 | Pritko et al. | 717/173 |
| 6,714,992 B1 * | 3/2004 | Kanojia et al. | 719/321 |
| 2002/0100036 A1 * | 7/2002 | Moshir et al. | 717/173 |
| 2004/0153869 A1 * | 8/2004 | Marinelli et al. | 714/47 |

FOREIGN PATENT DOCUMENTS

| EP | 0 905 984 A | 3/1999 |
| EP | 0 930 948 A | 10/1999 |

* cited by examiner

Primary Examiner—Antony Nguyen-Ba
(74) Attorney, Agent, or Firm—Fish & Richardson P.C.

(57) ABSTRACT

Deployment of a workstation includes receiving data related to the computing environment of workstations, organizing the workstations into groups based on at least one selectable common attribute among the data, and producing a deployment schedule based on the groups.

20 Claims, 5 Drawing Sheets